United States Patent [19]
De Groot et al.

[11] Patent Number: 5,493,394
[45] Date of Patent: Feb. 20, 1996

[54] METHOD AND APPARATUS FOR USE IN MEASURING FREQUENCY DIFFERENCE BETEWEN LIGHT SIGNALS

[75] Inventors: Peter J. De Groot, Middletown, Conn.; John A. McGarvey, Bellevue, Wash.

[73] Assignee: The Boeing Company, Seattle, Wash.

[21] Appl. No.: 249,312

[22] Filed: May 25, 1994

[51] Int. Cl.$^6$ ...................................................... G01B 9/02
[52] U.S. Cl. ............................................ 356/346; 356/349
[58] Field of Search .................................. 356/345, 346, 356/349, 351, 352

[56] References Cited

U.S. PATENT DOCUMENTS

| | | |
|---|---|---|
| 3,487,227 | 12/1969 | Kinzly . |
| 3,927,945 | 12/1975 | Bates . |
| 4,005,936 | 2/1977 | Redman et al. . |
| 4,023,906 | 5/1977 | Sica, Jr. . |
| 4,027,976 | 6/1977 | Amon . |
| 4,076,423 | 2/1978 | Bates . |
| 4,309,109 | 1/1982 | Blodgett et al. ........................ 356/352 |
| 4,426,155 | 1/1984 | Monchalin . |
| 4,702,603 | 10/1987 | Augustyn . |
| 4,892,406 | 1/1990 | Waters .................................... 356/349 |
| 5,116,133 | 5/1992 | Sweeney .................................. 356/346 |

*Primary Examiner*—Samuel A. Turner
*Attorney, Agent, or Firm*—Mary Y. Redman

[57] ABSTRACT

The frequency separation between two light signals, one having a first and the other having a second frequency, is determined by first forming three light beams, each including both frequencies; directing the three beams through an interferometer in which they traverse three optical paths having three different known optical path lengths; determining the interferometric phases for each of the three optical paths at both frequencies; and determining the difference between the first and second frequencies from the interferometric phases and known optical path lengths. The light signals may be light from two lasers operating at different frequencies. The optical path lengths can be predetermined by calibration using two light sources of know frequencies. An apparatus for carrying out this method is also disclosed.

10 Claims, 4 Drawing Sheets

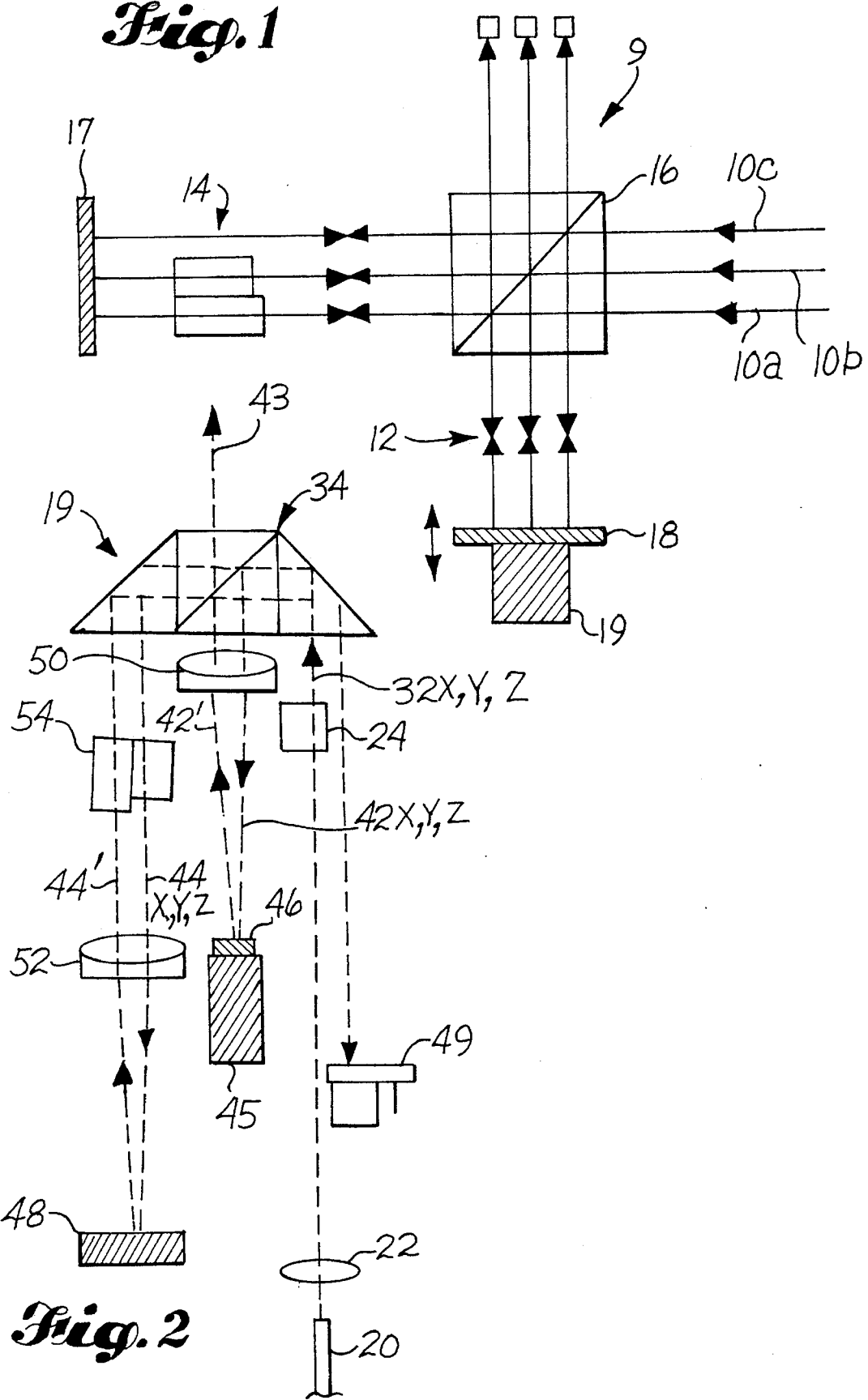

5,493,394

METHOD AND APPARATUS FOR USE IN MEASURING FREQUENCY DIFFERENCE BETEWEN LIGHT SIGNALS

FIELD OF THE INVENTION

This invention relates generally to optical frequency measurement devices and interferometry, and more specifically to measurement of frequency separation between two monochromatic sources, which can have applications in optical metrology, spectroscopy, and other optical instrumentation.

BACKGROUND OF THE INVENTION

Instruments for optical measurement of distances are of great importance in manufacturing processes which require precise distance measurements. They are being used in the manufacture of automobiles, airplanes, and other goods. These measurement instruments use laser light sources and often require precise knowledge of emission frequency.

Several gage tools which use interferometric techniques have been proposed. An example of one using two-wavelength interferometry is found in Williams et al., "Absolute Optical Ranging with 200 nm Resolution," *Optical Letters*, vol. 14, no. 11, pp. 542–544. The proposed tools require precise knowledge of the frequency separation of light from two laser sources, typically with a rapid update, absolute measurement accuracies on the order of 0.05 GHz, and an operational range of over 150 GHz. In some cases, the measurement must be made while the lasers are being rapidly tuned in frequency at rates greater than 250 GHz per second. The instrument for performing this measurement should be compact, inexpensive, and ruggedly packaged for use on the factory floor.

The object of the invention, therefore, is to provide a compact, inexpensive means for determining the frequency separation between two monochromatic sources with rapidity and a high degree of accuracy, capable of being ruggedized for use in practical applications such as manufacturing.

Such a device would also have application for absolute frequency measurement when calibrated against a known frequency, and to analysis of multiple spectral lines, where such lines are sequentially analyzed.

SUMMARY OF THE INVENTION

The invention provides a method and apparatus for determining the frequency separation between lasers or other monochromatic light sources with a high degree of accuracy and great rapidity. The invention is based on amplitude-division interferometry having three parallel beams, each with a different optical path length. The differences in interferometric phase corresponding to the two frequencies are measured for each of the three beams, and the frequency difference is then calculated.

In a preferred embodiment of the claimed invention, the frequency separation between two light signals, one having a first and the other having a second frequency, is determined by first forming three light beams, each including both frequencies; directing the three beams through an interferometer in which they traverse three optical paths having three different known optical path lengths; determining the interferometric phases for each of the three optical paths at both frequencies; and determining the difference between the first and second frequencies from the interferometric phases and known optical path lengths. The light signals may be light from two lasers operating at different frequencies. The optical path lengths can be predetermined by calibration using two light sources of know frequencies.

A preferred embodiment of an apparatus for carrying out this method is also disclosed. This apparatus includes beam splitter means for splitting an input light beam which includes light from each source into three parallel beams; a stationary object mirror; a movable reference mirror; an interference signal detector, which is preferably a three-element detector array; an optical assembly for splitting each of the three beams into parallel reference beams and object beams directed to the object mirror and reference mirror, respectively. This assembly also directs light returning from said object and reference mirrors to the detector array.

BRIEF DESCRIPTION OF THE DRAWINGS

The features set forth above and other features of the invention are made more apparent in the ensuing Detailed Description of the Preferred Embodiment when read in conjunction with the attached Drawings, wherein:

FIG. 1 is a schematic illustration showing the principle of operation of the invention;

FIG. 2 shows the optical layout of a preferred embodiment of the invention;

DETAILED DESCRIPTION OF THE PREFERRED EMBODIMENT

Figure 3:
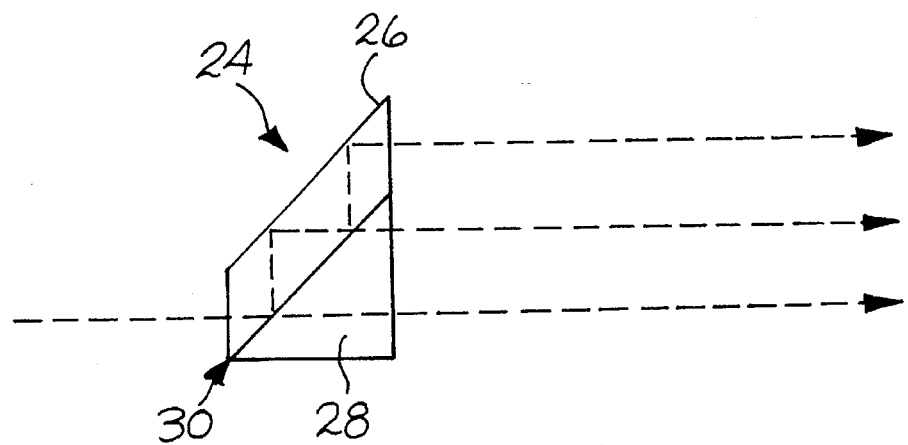
FIG. 3 is a detailed view of the 1- to 3-beam spatial multiplexing prism of the FIG. 2 embodiment.

To facilitate understanding, the underlying theory of operation of the invention will be explained first. Referring to FIG. 1, there is shown a schematic of an interferometer 9 for measuring frequency. The interferometer includes a beam splitter 16 which directs the incoming light beams 10a, 10b, 10c to an object mirror 17 and a movable reference mirror 18, affixed to a piezoelectric transducer (PZT) 19 which oscillates the reference mirror 18 in a manner known to those skilled in the art. The beams 10a, 10b, 10c follow three parallel optical paths, each having its own optical path length x, y, z respectively between the reference arm 12 and the object arm 14. By comparison of the interferometric phases for the three optical path lengths at two frequencies, the frequency separation can be determined as explained below.

The following symbols will be used in this discussion:

| | |
|---|---|
| $v_1, v_2$ | optical frequencies of two laser sources (speed of light/wavelength) |
| $\bar{v}$ | average of $v_1$ and $v_2$ |
| $\Delta v$ | difference between $v_1$ and $v_2$ |
| $\Delta v' \Delta v''$ | first and second estimates of $\Delta v$ |
| x,y,z | phase-velocity path lengths |
| $\bar{x}, \bar{y}, \bar{z}$ | phase-velocity path lengths at a frequency $v = \bar{v}$ |
| X,Y,Z | group-velocity path lengths for frequencies near $v = \bar{v}$ |

-continued

| | |
|---|---|
| $\theta_{1x}, \theta_{2x}$ | interferometric phases at $v_1, v_2$ at a distance x. |
| $\Phi_x$ | synthetic phase, equal to $\theta_{1x} - \theta_{2x}$ |
| $\Phi''_x$ | estimate of synthetic phase $\Phi_x$, based on $\Delta v''$ |
| $\tilde{\Phi}_x$ | synthetic phase modulo $2\pi$ |
| $\Psi_{xy}$ | difference in synthetic phases $\Phi_x$ and $\Phi_y$ |
| $\Psi'_{xy}$ | estimate of difference in synthetic phases $\Phi_x$ and $\Phi_y$, based on $\Delta v''$ |
| $\tilde{\Psi}_{xy}$ | synthetic phase difference modulo $2\pi$ |
| $m_x$ | integer part of $\Phi_x/2\pi$, equal to $\frac{1}{2\pi} (\Phi_x - \tilde{\Phi}_x)$ |

The interferometric phases $\theta_{1x}, \theta_{2x}$ are dependent upon the frequencies $v_1, v_2$ according to $$\theta_{1x}=(2\pi x/c)v_1 \text{ and } \theta_{2}=(2\pi x/c)v_2 \quad (1a, 1b)$$

Similar equations can be written for the y and z phase velocity path lengths. The difference in phase, referred to here as the "synthetic phase," for a frequency separation $\Delta v = v_1 - v_2$ is $$\Phi_x = \theta_{1x} - \theta_{2x} = (2\pi X/c)\Delta v \quad (2)$$

where $$X = \bar{x} + \bar{v} dx/dv \quad (3)$$

is the group-velocity path length associated with $x = \bar{x}$ at an average frequency $\bar{v}$. The phase difference $\Phi_x$ can be divided into two parts, the first part being an integer $m_x$ multiplied by $2\pi$ and a second part $\tilde{\Phi}_x$ that is commonly called the fractional phase. Normally, it is only the fractional phase that can be determined directly from an interference effect with a single optical path difference, and the integer part is not known. Thus it is not ordinarily possible to measure $\Delta v$ without ambiguity by inverting Equation (2). However, with three path differences x, y, z there results a system of three equations $$\Delta v = (c/2\pi X)(2\pi m_x + \tilde{\Phi}_x) \quad (4a)$$

$$\Delta v = (c/2\pi Y)(2\pi m_y + \tilde{\Phi}_y) \quad (4b)$$

$$\Delta v = (c/2\pi Z)(2\pi m_z + \tilde{\Phi}_z) \quad (4c)$$

which for a well-chosen set of path differences $X<Y<Z$ can be solved exactly for $\Delta v$. The method for solving this system of equations is similar to that taught in an article entitled "Three Color Laser Diode Interferometer," by P. de Groot (*Applied Optics*, vol. 30, pp. 3612–3616) which is incorporated herein by reference.

For some range of possible frequency differences, the apparatus can be designed so that $Z-Y$ is known to be less than $c/\Delta v$. Then Equation 4c minus Equation 4b can be used for a first estimate $\Delta v'$ of the frequency difference without ambiguity:

$$\Delta v' = \frac{c}{2\pi(Z-Y)} \tilde{\Psi}_{zy}, \quad (5)$$

where $$\tilde{\Psi}_{zy} = \tilde{\Phi}_z - \tilde{\Phi}_y. \quad (6)$$

Then using the fact that $m_x$ and $m_y$ are integers, Equation 4b minus Equation 4a yields a second estimate $\Delta v''$ of higher accuracy:

$$\Delta v'' = \frac{c}{(Y-X)} \left( Int\left\{ \frac{1}{2\pi}(\psi'_{yx} - \psi_{yx}) \right\} + \frac{1}{2\pi} \psi_{yx} \right) \quad (7)$$

where the function $Int\{\}$ is equal to the nearest integer of its argument, and the approximation $$\psi'_{yz} = 2\pi \frac{(Y-X)\Delta v'}{c} \quad (8)$$

is free of phase ambiguities. Finally, a third and final calculation $\Delta v'''$ of the frequency difference uses Equation 4a alone, $$\Delta v''' = \frac{c}{X} \left( Int\left\{ \frac{1}{2\pi}(\Phi''_x - \Phi_x) \right\} + \frac{\Phi_x}{2\pi} \right) \quad (9)$$

where $$\Phi''_x = 2\pi \frac{X\Delta v''}{c}. \quad (10)$$

In practice, the path lengths X,Y,Z may be calibrated using a known frequency difference $\Delta v$ and inverted forms of Equations 5, 8 and 10.

FIG. 2 shows a practical implementation of an interferometer 19 which utilizes this theory of operation. Incoming light from two monochromatic sources, such as lasers or laser diodes operating at different frequencies, travels through a fiber 20 to a collimating lens 22, and is then split into three parallel beams by a 1- to 3-beam spatial multiplexing prism 24, which is shown in greater detail in FIG. 3. The 1- to 3-beam prism 24 includes a rhombohedron 26 abutting a right angle prism 28. The surface 30 between their abutting sides is partially reflective. Preferably, it is 50% reflective. The exact size and geometry of the rhombohedron 26 and prism 28 are as chosen so as to form three exit beams 32x, 32y and 32z. These three beams are in a plane perpendicular to the plane of FIG. 2.

Figure 4:
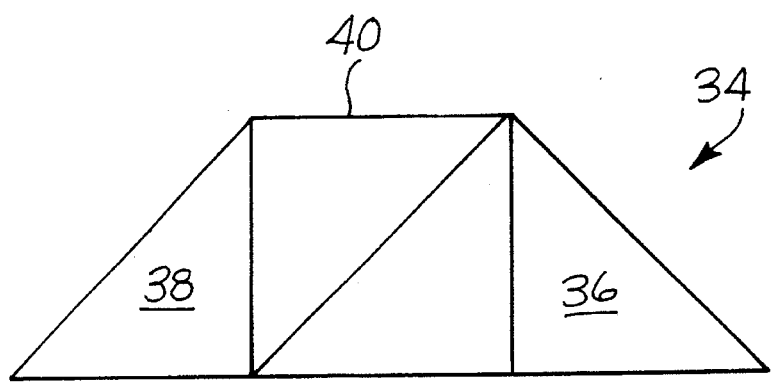
FIG. 4 is a detailed view of the amplitude division optical assembly of the FIG. 2 embodiment.

Referring again to FIG. 2, the three beams 32x,y,z enter an amplitude division optical assembly 34, shown in greater detail in FIG. 4. This assembly 34 comprises two right angle prisms 36, 38 abutting opposite sides of a beam splitter 40. Referring again to FIG. 2, the assembly 34 serves several functions. It splits the incoming set of three beams 32x,y,z into a set of three reference beams 42x,y,z and three object beams 44x,y,z and directs the reference and object beams in a direction opposite the incoming direction toward a reference mirror 46 and an object mirror 48, respectively. The reference mirror 46 is mounted to a PZT 45. Appropriate mounting means are well-known to those skilled in the art.

The assembly 34 also directs the reflected beams 42' and 44' returning from the mirrors 46, 48 to a detector array 49, which detects the interference signals.

The geometry of the assembly 34 is chosen so that the input beams 32x,y,z, the reference beams 42x,y,z and the object beams 44x,y,z are parallel and remain parallel even when the assembly 34 is rotated within the plane of FIG. 2. This greatly reduces the sensitivity of the device to alignment errors, and also allows the assembly 34 to be rotated through small angles to reduce the effects of secondary reflections from the prism surfaces. It will be appreciated that the design of the assembly 34 also allows for a compact and rugged apparatus.

The assembly 34 also directs an exit beam 43 out of the interferometer 19. This exit beam 43 can be used to check alignment, or for a spectroscopic technique described in connection with FIG. 7 below.

Achromatic lenses 50, 52 are disposed in the path of the reference beams 42x,y,z and object beams 44x,y,z, and positioned so as to focus the beams on the reference mirror 46 and object mirror 48, respectively. As will be apparent to those skilled in the art, the alignment of the interferometer 19 is thus rendered insensitive to a first order, to rotation of these mirrors. Also, due to the focusing property of these lenses 50, 52, the PZT-actuated reference mirror 46 can be made very small and light.

Figure 5:
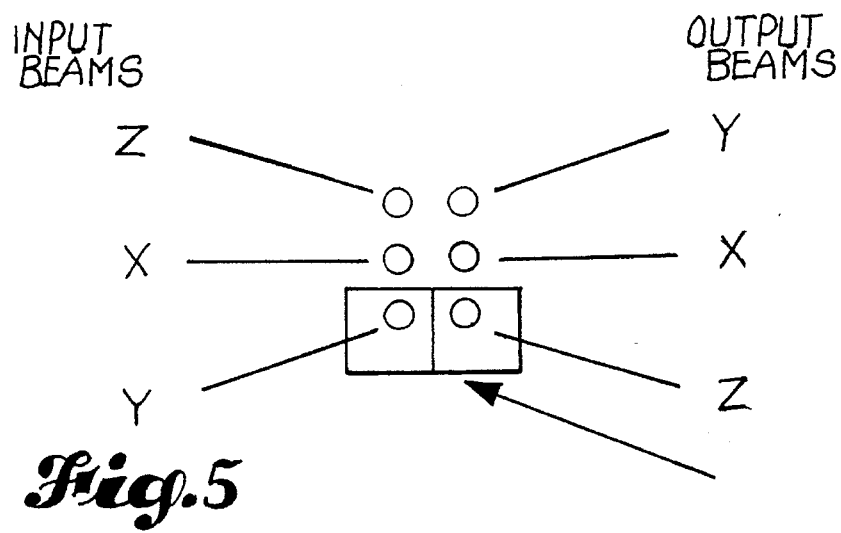
FIG. 5 is a cross-sectional view taken along line A—A of FIG. 2.

Path-change optics 54 of a type which may be chosen from those well-known in the interferometry art lie in the path of the object beams 44 between the assembly 34 and the achromatic lens 56. As shown in FIG. 5, these path change optics 54 are positioned so that two of the three beams 44x, 44y, 44z pass through the path change optics 54.

Figures 6, 7:
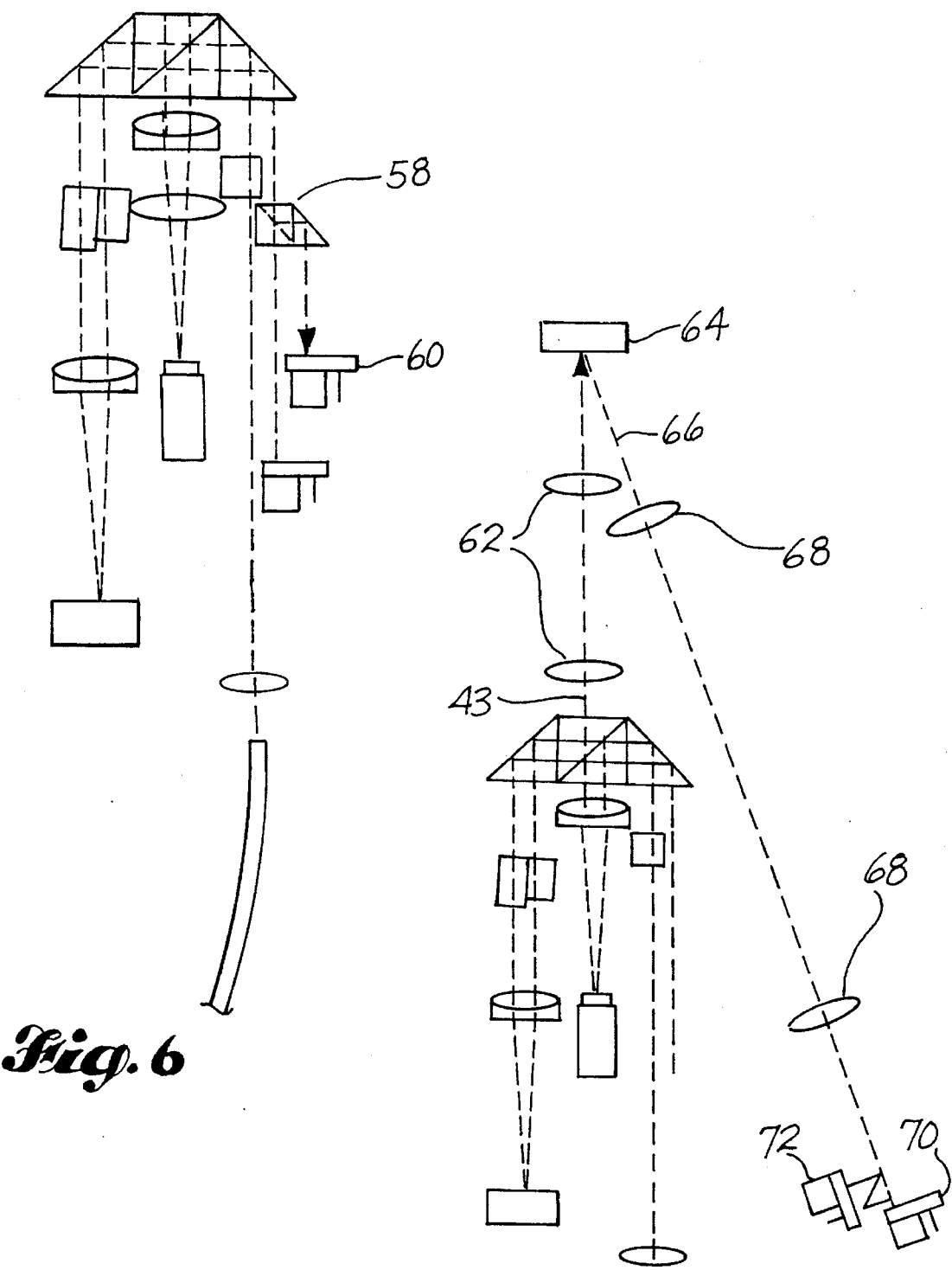
FIGS. 6 and 7 show the FIG. 2 embodiment as used with alternative phase detection systems.

The interferometer 19 shown in FIG. 2 can be used with a variety of well-known phase detection systems. Such systems include:

1. Sequential measurement of phases with first one laser then the other, using the PZT 45 and standard PMI techniques, or frequency-tunable lasers and pseudo-heterodyne techniques, both known in the art. This time-multiplexed approach can be used for several lasers in sequence;
2. Direct measurement of phase differences for two simultaneously operating tunable lasers, using chirped-synthetic wavelength detection methods such as that described in our copending patent application Ser. No. 07/879,836, filed May 6, 1992 for Chirped Synthetic Wavelength Radar, which is incorporated herein by reference;
3. Direct measurement of phase differences for two simultaneously operating lasers, using amplitude or frequency modulation to encode the signals. Appropriate encoding apparatus and electronic post-processing are taught, for example, in an article by O. Sosaki, et al. in *Applied Optics,* vol. 30 pp. 4040–4044, which is incorporated herein by reference;
4. Direct measurement of phase differences for two simultaneously operating lasers, using electric field polarization to encode the signals. Use of polarization to encode signals from two different lasers is taught in an article by A. J. den Boef in *Applied Optics,* vol. 27, pp 306–311, which is incorporated herein by reference. As shown in FIG. 6, application to the present invention can be easily achieved by introducing a polarization beam splitter 58 and a second detector array 60 in an alternative embodiment, which is otherwise identical to the FIG. 2 embodiment; and
5. Simultaneous measurement of phases for two or more lasers, using separation of wavelengths by spectral analysis at the interferometer output. This approach is appropriate if the approximate wavelengths of the lasers are known, and if their frequency separation is greater than 50 GHz, so that they may easily be resolved with a 2.5 cm diffraction grating. An optical geometry for achieving this is shown in FIG. 7. It includes an interferometer 19 as described above, with cylindrical expansion optics 62 which direct exit beam 43 to a diffraction grating 64. The diffracted beam 66 travels through cylindrical telescopic optics 68 to a pair of 3-element detector arrays 70, 72.

Figure 8:
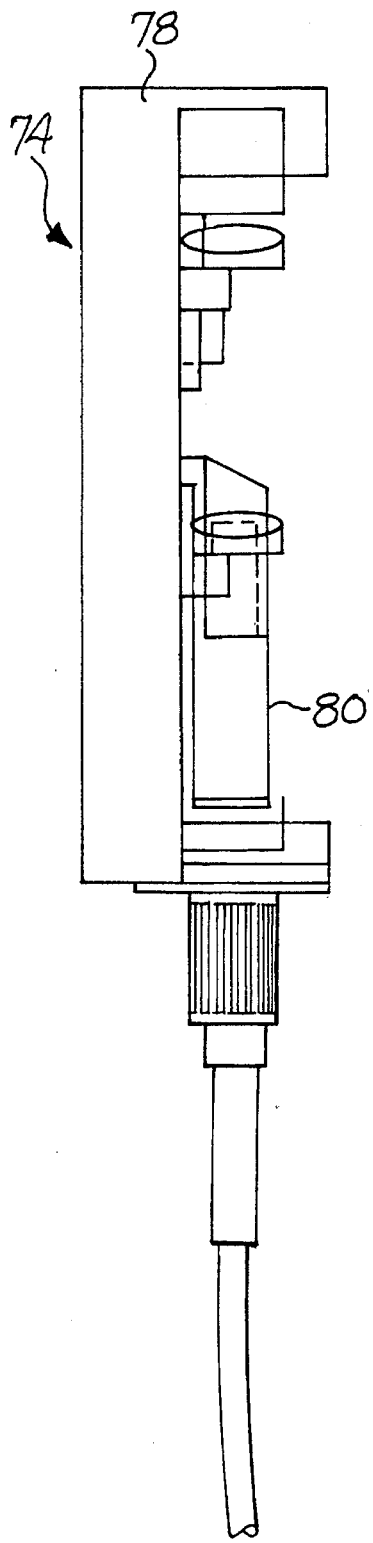
FIG. 8 is a side view of the mechanical packaging of the FIG. 2 embodiment.
Figure 9:
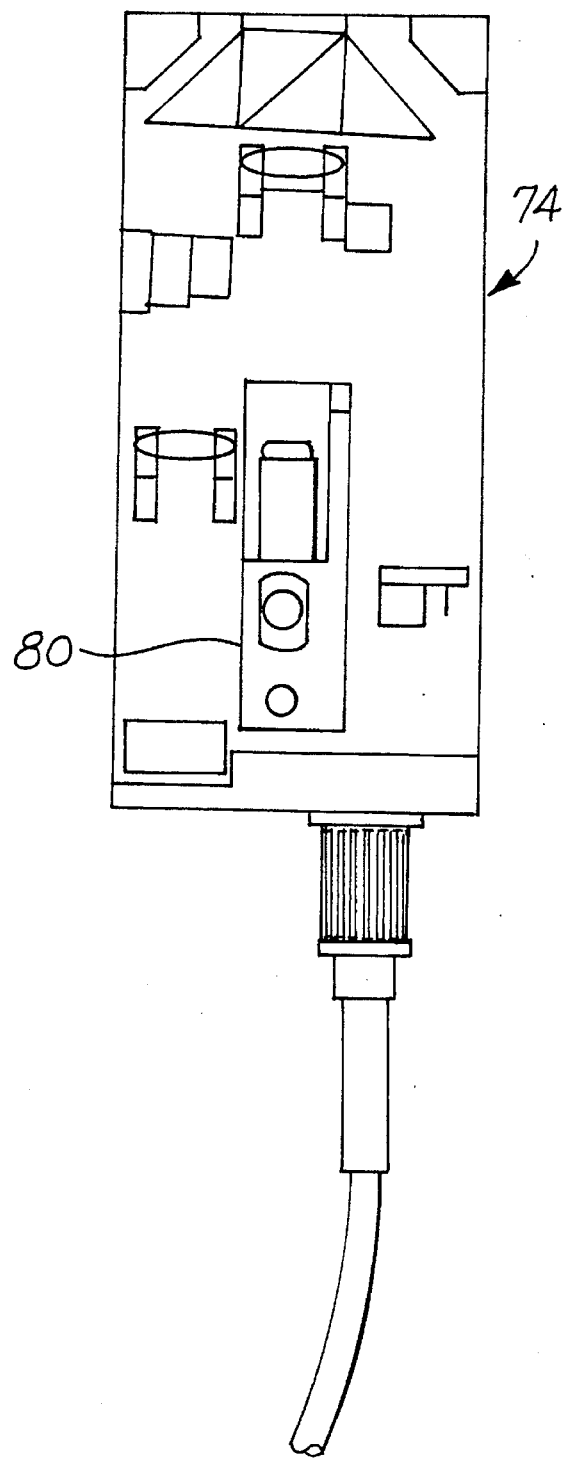
FIG. 9 is a plan view of the packaging of FIG. 8.

Referring now to FIGS. 8 and 9, a rugged mechanical package 74 for the preferred embodiment includes a base plate 78 and a mounting block 80 for the PZT which is affixed to the base plate 78. These pieces are preferably machined from aluminum, stainless steel, or Invar. The base plate 78 includes mounting brackets for the various optical components, which are affixed thereto by any well-known means. In operation, optical path lengths of X=40 mm, Y=41.5 mm, Z=41.75 mm, and lasers operating at wavelengths near 780 nm have been found to be preferable.

Although the invention has been described with respect to a particular preferred embodiment, it will be understood that variations and modifications are possible in light of the above teachings. Such variations or modifications may be within the scope of the claims.

What is claimed is:

1. An apparatus for use in measuring the frequency separation of light from two sources, comprising:

means for splitting an input light beam comprising light from each source into three parallel beams;

a stationary object mirror;

a movable reference mirror;

means for detecting interference signals; and an optical assembly for splitting each of said three beams into parallel reference beams and object beams directed to the object mirror and reference mirror, respectively, and directing light returning from said object and reference mirrors to said means for detecting interference signals.

2. The apparatus of claim 1 further comprising a first achromatic lens disposed in the path of the reference beams so as to focus said reference beams on the reference mirror and a second achromatic lens disposed in the path of the object beams so as to focus said object beams on the object mirror.

3. The apparatus of claim 2 wherein said means for detecting interference signals comprises an array of photo detectors.

4. The apparatus of claim 1 wherein said optical assembly comprises:

a beam splitter which includes a pair of right angle prisms positioned in abutment with each other so as to form a rectangular prism, with a beam splitting surface at their abutting faces a first and a second right angle prism, said first and second right angle prisms abutting on opposite sides of said rectangular prism, so as to form with said rectangular prism a block having a trapezoidal cross section.

5. The apparatus of claim 4 wherein said splitting means comprises a rhombohedron abutting a right angle prism.

6. A method for determining the frequency separation between two light signals, one having a first and the other having a second frequency, comprising in sequence the steps of:

forming three beams from said two light signals, each of said three beams including light of each of said first and said second frequency;

directing said three beams through an interferometer in which said each of said three beams is split into respective pairs of reference beams and object beams which traverse three optical paths having three different predetermined optical path lengths;

determining the interferometric phases between the reference beam and object beam for each of said three optical paths at said first and said second frequency; and determining the difference between said first and said second frequencies from said interferometric phases and said known optical path lengths.

7. The method of claim 6 wherein the light signals comprise exit beams from two lasers.

8. The method of claim 7 wherein said step of forming three beams includes directing said light signals through a one-to-three-beam prism assembly.

9. The method of claim 8 wherein the step of determining the interferometric phases includes sequentially determining the interferometric phases for said first frequency and for said second frequency.

10. The method of claim 8 wherein the step of determining the interferometric phases includes simultaneously determining the interferometric phases for said first frequency and for said second frequency.

* * * * *